United States Patent
Krehmer et al.

(10) Patent No.: US 11,001,116 B2
(45) Date of Patent: May 11, 2021

(54) ELECTROMECHANICAL CHASIS ACTUATOR

(71) Applicant: Schaeffler Technologies AG & Co. KG, Herzogenaurach (DE)

(72) Inventors: Hartmut Krehmer, Erlangen (DE); Benjamin Wübbolt-Gorbatenko, Erlangen (DE)

(73) Assignee: Schaeffler Technologies AG & Co KG, Herzogenaurach (DE)

( * ) Notice: Subject to any disclaimer, the term of this patent is extended or adjusted under 35 U.S.C. 154(b) by 20 days.

(21) Appl. No.: 16/333,374

(22) PCT Filed: Oct. 19, 2017

(86) PCT No.: PCT/DE2017/100903
§ 371 (c)(1),
(2) Date: Mar. 14, 2019

(87) PCT Pub. No.: WO2018/077345
PCT Pub. Date: May 3, 2018

(65) Prior Publication Data
US 2019/0248203 A1    Aug. 15, 2019

(30) Foreign Application Priority Data
Oct. 27, 2016    (DE) .......................... 102016221206.0

(51) Int. Cl.
*B60G 13/14*    (2006.01)
*B60G 17/015*    (2006.01)
(Continued)

(52) U.S. Cl.
CPC ......... *B60G 13/14* (2013.01); *B60G 17/0157* (2013.01); *F16F 1/121* (2013.01);
(Continued)

(58) Field of Classification Search
CPC ................ B60G 13/14; B60G 17/0157; B60G 2202/422; B60G 2202/441;
(Continued)

(56) References Cited

U.S. PATENT DOCUMENTS 5,678,847 A * 10/1997 Izawa .................. B60G 15/063
280/5.515
6,340,080 B1 * 1/2002 Carlson .............. A63B 21/0056
188/267
(Continued)

FOREIGN PATENT DOCUMENTS

DE           19955410 A1    5/2001
DE           10120102 A1   10/2002
(Continued)

*Primary Examiner* — Paul N Dickson
*Assistant Examiner* — Timothy Wilhelm
(74) *Attorney, Agent, or Firm* — Reid A. Baldwin

(57) ABSTRACT

An electromechanical chassis actuator includes a single electric motor and two screw drives. The two screw drives use a common threaded spindle. A spindle nut of the first screw drive is rotationally fixed to the electric motor's rotor and engages the threaded spindle in a back-driveable manner. A spindle nut of the second screw drive is selectively coupled to the electric motor's rotor by a coupler and engages the threaded spindle in a self-locking (not back-driveable) manner. When the coupler is in an engaged position, the actuator operates in a level-adjustment mode. When the coupler is in a released position, the actuator operates in a damping mode.

8 Claims, 2 Drawing Sheets

(51) Int. Cl.
  *F16F 9/56* (2006.01)
  *F16F 15/03* (2006.01)
  *F16F 1/12* (2006.01)

(52) U.S. Cl.
  CPC ............ *F16F 9/56* (2013.01); *F16F 15/03* (2013.01); *B60G 2202/422* (2013.01); *B60G 2202/441* (2013.01); *B60G 2500/30* (2013.01); *F16F 2232/06* (2013.01)

(58) Field of Classification Search
  CPC ........ B60G 2500/30; F16F 9/56; F16F 15/03; F16F 1/121; F16F 2232/06
  See application file for complete search history.

(56) References Cited

U.S. PATENT DOCUMENTS

| | | | | |
|---|---|---|---|---|
| 7,232,016 B2* | 6/2007 | Namuduri | ................ | F16F 9/53 188/267.1 |
| 7,303,056 B2* | 12/2007 | Namuduri | .......... | B60G 17/0152 188/267.2 |
| 7,475,883 B2* | 1/2009 | Christophel | ....... | B60G 17/0157 280/43.17 |
| 7,665,585 B2* | 2/2010 | Alexandridis | ....... | B60G 17/021 188/280 |
| 7,722,056 B2* | 5/2010 | Inoue | .................... | B60G 13/14 280/5.512 |
| 8,109,371 B2* | 2/2012 | Kondo | ................ | B60G 15/063 188/266.3 |
| 8,371,588 B2* | 2/2013 | Kohlhauser | .......... | B60G 15/065 280/5.514 |
| 8,469,370 B2* | 6/2013 | Kondo | ................ | B60G 17/02 280/5.514 |
| 8,544,620 B2* | 10/2013 | Inoue | .................... | F16F 15/03 188/297 |
| 8,622,864 B2* | 1/2014 | Fauteux | .................. | B25J 9/102 475/91 |
| 8,641,053 B2* | 2/2014 | Pare | .................. | B60G 17/0521 280/5.515 |
| 8,701,845 B2* | 4/2014 | Kondo | .................. | G06K 9/346 188/266.1 |
| 8,770,593 B2* | 7/2014 | Moore | .................. | B60G 17/00 280/5.515 |
| 8,890,461 B2* | 11/2014 | Knox | .................. | B60G 17/018 318/625 |
| 9,068,616 B1* | 6/2015 | Serbu | .................. | B60G 17/021 |
| 9,091,309 B2* | 7/2015 | Battlogg | ............. | F16C 33/6688 |
| 9,707,819 B2* | 7/2017 | Dobre | .................. | B60G 15/062 |
| 10,318,002 B2* | 6/2019 | Battlogg | .................. | G05G 5/03 |
| 10,406,883 B2* | 9/2019 | Marking | ................ | B60G 15/12 |
| 10,480,237 B2* | 11/2019 | Battlogg | .................. | E05F 15/00 |
| 10,502,293 B2* | 12/2019 | Foucaut | .................. | H02K 7/06 |
| 10,625,556 B2* | 4/2020 | Plante | .................... | B60N 2/502 |
| 2005/0212189 A1* | 9/2005 | Kondo | .................. | F16F 15/03 267/195 |
| 2008/0111334 A1* | 5/2008 | Inoue | .................. | B60G 17/021 280/124.1 |
| 2009/0121398 A1* | 5/2009 | Inoue | .................. | B60G 15/067 267/140.14 |
| 2010/0308518 A1* | 12/2010 | Michel | ................ | B60G 17/021 267/218 |
| 2011/0221109 A1* | 9/2011 | Hinouchi | ................ | F16H 25/20 267/221 |
| 2016/0084333 A1* | 3/2016 | Adoline | .................. | F16F 1/121 267/140.2 |
| 2016/0177612 A1* | 6/2016 | Buchheim | ................ | E05F 5/08 296/50 |

FOREIGN PATENT DOCUMENTS

| | | |
|---|---|---|
| DE | 102005059117 A1 | 6/2007 |
| DE | 102006052253 B3 | 7/2008 |
| DE | 102010013935 A1 | 10/2011 |
| DE | 102014215420 A1 | 2/2015 |
| EP | 1515064 B1 | 3/2005 |
| EP | 2098386 A1 | 9/2009 |
| JP | 2005106106 A | 4/2005 |
| JP | 2006064101 A | 3/2006 |
| WO | 2011080163 A1 | 7/2011 |

* cited by examiner

ELECTROMECHANICAL CHASIS ACTUATOR

CROSS-REFERENCE TO RELATED APPLICATIONS

This application is the U.S. National Phase of PCT Appln. No. PCT/DE2017/100903 filed Oct. 19, 2017, which claims priority to DE 10 2016 221 206.0 filed Oct. 27, 2016, the entire disclosures of which are incorporated by reference herein.

TECHNICAL FIELD

The disclosure relates to an electromechanical chassis actuator suitable for use in a motor vehicle.

BACKGROUND

An adjustment drive for the localized adjustment of a chassis component is known from DE 10 2006 052 253 B3. This adjustment drive has a plurality of wheels arranged partially eccentrically to one another and is connected to a control arm which is provided to attach a vehicle wheel to an auxiliary frame.

DE 10 2005 059 117 A1 discloses an actuator for an active chassis of a motor vehicle which comprises a hydraulic or pneumatic actuating cylinder and a compensation spring, wherein the actuator is to be designed in such a manner that the static body mass of the motor vehicle is borne by the compensation spring.

SUMMARY

This disclosure seeks to specify an electromechanical chassis actuator which has a broader functionality compared with the prior art.

Embodiments and advantages explained in the following in connection with a method of operation, similarly also apply to a device, in other words the electromechanical chassis actuator, and vice versa.

The chassis actuator has two screw drives which each have their own threaded spindle and their own spindle nut. In each case, the electromechanical chassis actuator only has a single electric motor. The rotor of this electric motor is coupled or can be coupled to at least one spindle nut. In addition, the chassis actuator has a switchable coupling which interacts with the screw drives of the chassis actuator. The switchable coupling is used to switch between a level-adjustment mode and a damping mode of the screw drive.

If the level-adjustment mode of the chassis actuator is activated, a level adjustment of the chassis according to the principle described in DE 10 2014 215 420 A1, for example, takes place.

In the damping mode, on the other hand, a linear movement of the threaded spindle is converted into a rotation of the spindle nut which is damped by electromagnetic forces. Different electromagnetic dampers which work according to this principle are disclosed in documents EP 1 515 064 B1 and DE 10 2010 013 935 A1, for example.

The electric motor of the electromechanical chassis actuator may be operated as a generator in damping mode. Likewise, it is possible in damping mode for a torque to be actively applied to the rotor coupled to the spindle nut by energizing stator windings in the electric motor.

If the electromechanical chassis actuator is operated in level-adjustment mode, a lifting of the vehicle body is possible in that a torque is applied to the spindle nut by means of the electric motor. The electric motor can be operated as a generator when lowering the level of the vehicle body, insofar as the screw drive is not a self-locking gear, in particular a ball screw drive. In each case, the electric motor with which the damping effect of the chassis actuator is achieved in damping mode is identical to the electric motor used for level adjustment. The electromechanical chassis actuator is preferably used with single wheel suspensions. Use with other axle constructions, for example twist-beam axles, is also possible in principle. Rather than a ball screw drive or a plurality of ball screw drives, the chassis actuator may also have at least one screw drive of another design, for example a single movement thread without a roller body.

The chassis actuator has two screw drives arranged coaxially to one another which each comprise a separate threaded spindle and also an associated spindle nut. In this case, the rotor of the single electric motor of the chassis actuator is rigidly connected to the spindle nut of one of the two screw drives. A rigid connection in this case is understood to mean any non-rotational connection, including with the insertion of a damping element. In contrast to the first screw drive, the spindle nut is releasably connected to the rotor of the electric motor in the case of the second screw drive, namely switchably via the coupling. As an option in this case, a further gear designed as a step-down gear is inserted between the electric motor and the switchable screw drive. The second switchable screw drive is preferably used exclusively in the level-adjustment mode of the chassis actuator. The coupling is preferably configured as an MRF coupling, in other words as a coupling which works with a magnetorheological fluid. Alternatively, for example, a frictional coupling or a switchable, form-fitting coupling of any design can be used.

According to an advantageous embodiment of the chassis actuator design with two screw drives, the threaded spindle of the screw drive which comprises the spindle nut that can be driven via the switchable coupling is configured as a hollow spindle. The embodiment as a hollow spindle has the advantage that the threaded spindle of the first screw drive, in other words of the screw drive in which the spindle nut is rigidly connected to the rotor of the electric motor, can engage with the threaded spindle configured as a hollow spindle in a space-saving manner.

The two screw drives of the chassis actuator can be clearly assigned to the two modes in which the chassis actuator can be operated. The first screw drive in which the rotor of the electric motor and the spindle nut form a component which is inherently rigid and not separable during correct operation has a central function in the damping mode. To perform this function, the first screw drive does not have a self-locking design. On the other hand, the second switchable screw drive only comes into operation in the level-adjustment mode. The retention of a level adjustment of the chassis is favored by the self-locking design of this screw drive. Alternatively or in addition, a locking mechanism locking the second screw drive may be provided.

The linear displacement of a spring plate may also be provided in the first variant of the chassis actuator, insofar as this is operated in level-adjustment mode. In defined level settings of the chassis actuator, the spring plate can be fixed in both variants, preferably with the help of an indexing mechanism. In a fixed setting of this kind, the chassis actuator can then be operated in damping mode as an electromechanical damper.

In general, the different operating modes of the chassis actuator exhibiting a coupling can be distinguished from one another in the following way:
- in a first switching position of the coupling, a level adjustment of a chassis is undertaken by means of an electrically actuated screw drive (level-adjustment mode),
- in a second switching position of the coupling, a damping action of the chassis actuator is achieved by means of a screw drive which is not necessarily identical to the screw drive used in the level-adjustment mode, but is in each case coupled to the same electrical drive, wherein a damping force acts on a rotating component of the screw drive (damping mode).

The advantage of the electromechanical chassis actuator is, in particular, that on the one hand an electromechanical shock absorber function and, on the other hand, a level adjustment or level control function is achieved with the help of a single electric motor that can also be operated as a generator.

BRIEF DESCRIPTION OF THE DRAWINGS

Two exemplary embodiments are explained in greater detail below with the help of drawings. In the drawings.

DETAILED DESCRIPTION

Figure 1:
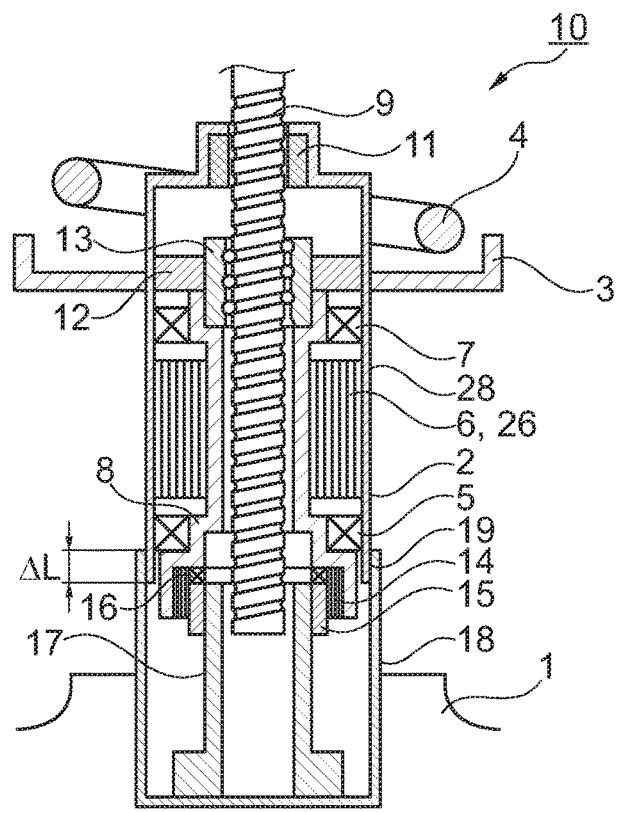
FIG. 1 shows a first exemplary embodiment of an electromechanical chassis actuator as a schematic sectional representation.

Unless otherwise indicated, the following observations apply to both exemplary embodiments.

A chassis actuator identified as a whole by the reference number 10 is provided for installation in a motor vehicle. In this case, a housing 2 of the vehicle actuator 10 is received by a wheel carrier 1 of the motor vehicle which is not further depicted. The housing 2 has a multi-part design and is connected to a spring plate 3 on which a chassis spring 4 is supported. An electric motor 6 configured as a hollow shaft motor is located in the housing 2, the rotor of said electric motor being labeled 26. The rotor 26 is fixedly connected to a sleeve 8 which is mounted rotatably in the housing 2 with the help of bearings 5, 7. The sleeve 8 surrounds a threaded spindle 9 concentrically. With the help of a slide bearing element 11, the threaded spindle 9 is mounted displaceably in the housing 2. Twisting of the threaded spindle 9 is not provided for. The threaded spindle 9 is secured on the vehicle body to prevent twisting.

The threaded spindle 9 forms a screw drive along with a spindle nut 13. Balls roll as the rolling body between the spindle nut 13 and the threaded spindle 9; the screw drive is therefore configured as a ball screw drive. The spindle nut 13 is fixedly connected to the rotor 26 of the electric motor 6 via the sleeve 8. The upper end of the threaded spindle 9 that cannot be identified in the figures is connected to a vehicle body. Each deflection and rebound of the chassis spring 4 is accompanied by a linear movement of the threaded spindle 9 which is converted into a rotation of the rotor 26 of the electric motor 6. The electric motor 6 in this case is operated as a generator and acts as an electromagnetic damping element which replaces or supplements another, for example hydraulic, damper.

In the exemplary embodiment according to FIG. 1, a centrifugal force brake 12 which acts between the spindle nut 13 and the housing 2 is connected to the spindle nut 13. In a corresponding manner, a centrifugal force brake can also be integrated in the chassis actuator according to FIG. 2. A centrifugal force brake of this kind within an electromagnetic shock absorber is known in principle from DE 10 2010 013 935 A1.

The housing 2 of the chassis actuator 10 according to FIG. 1 comprises a lower housing part 18 which is held on the wheel carrier 1 and also an upper housing part 28 which is displaceable relative to the lower housing part 18. In order to displace the upper housing part 28 relative to the lower housing part 18, a second screw drive is provided within the chassis actuator 10 which is made up of a threaded spindle 17 configured as a hollow spindle and a spindle nut 15. The screw drive formed from the threaded spindle 17 and the spindle nut 15 is a simple movement thread with self-locking properties. The spindle nut 15 can be coupled to the sleeve 8 via a coupling 14 which is configured as an MRF coupling in the present case. In addition, a bearing element 16 for the axial bearing of the sleeve 8 on the threaded nut 15 can be identified in FIG. 1. The threaded spindle 9 of the first screw drive engages with the hollow threaded spindle 17, as likewise emerges from FIG. 1.

If the switchable coupling 14 is closed, the spindle nut 15 can be driven by the electric motor 6. The level-adjustment mode of the chassis actuator 10 is activated by the closed coupling 14. The rotation of the rotor 26 in this case is converted into a displacement between the housing parts 18, 28, wherein a rotational lock is effective between the housing parts 18, 28. A possible displacement path is referred to as ΔL in FIG. 1. The displacement path ΔL corresponds to a displacement of the spring plate 3 in the longitudinal direction of the threaded spindle 9. In this way, the chassis actuator 10 can be operated as an actuator for level adjustment through the second screw drive, in other words through the screw drive comprising the threaded spindle 17 and the spindle nut 15.

As soon as a desired chassis level has been set, the switchable coupling 14 is opened so that the chassis actuator 10 can be operated as a damper, in other words in damping mode, in which the rotor 26 can be driven through displacement of the threaded spindle 9. A linear guide between the housing parts 18, 28 is labeled 19 in FIG. 1.

Figure 2:
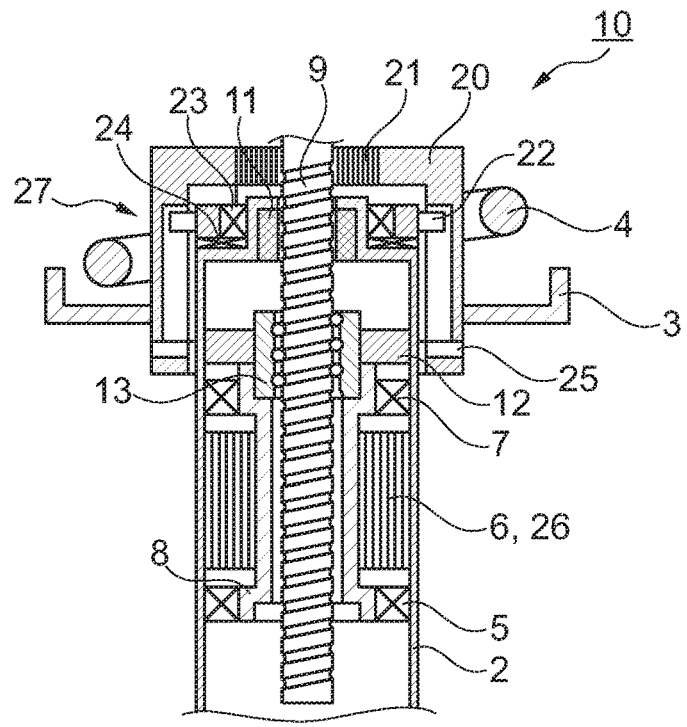
FIG. 2 shows a further electromechanical chassis actuator in a depiction similar to FIG. 1, FIGS. 3 to 5 show components of the chassis actuator according to FIG. 2.
Figure 3:
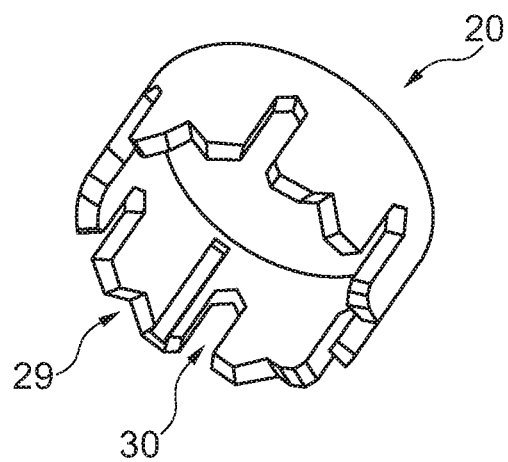
Figure 4:
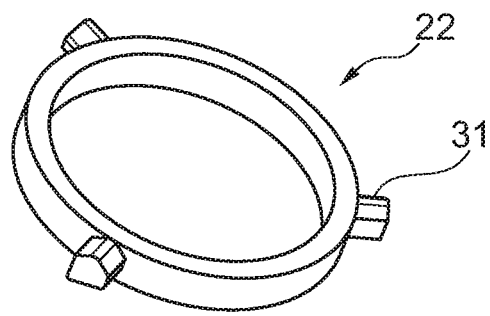
Figure 5:
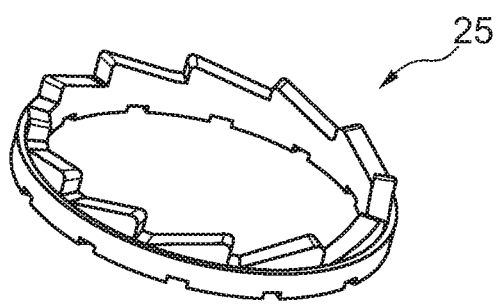

In the exemplary embodiment according to FIG. 2, the spring plate 3 which is also height-adjustable in this case is connected to a locking sleeve 20 which is height-adjustable in respect of the housing 2 and just like this surrounds the threaded spindle 9 concentrically. A connection which is not displaceable in the longitudinal direction of the threaded spindle 9 between said threaded spindle and the locking sleeve 20 can be produced and released in the embodiment according to FIG. 2 by a coupling 21. If the coupling 21 is open, in other words there is no coupling between the locking sleeve 20 and the threaded spindle 9 in the axial direction, the chassis actuator 10 can be used in conjunction with the exemplary embodiment according to FIG. 1 as an electromagnetic damper.

If, on the other hand, the coupling 21 is closed, the locking sleeve 20 is displaceable, in other words height-adjustable, along with the threaded spindle 9 in the axial direction. The locking sleeve 20 acts along with a locking ring 22 and a switch ring 25, as is known in principle from DE 10 2014 215 420 A1. In FIG. 2, in addition, bearings 23, 24 for the radial or axial bearing of the locking ring 22 on the housing 2 can be recognized in FIG. 2. The locking unit formed by the locking sleeve 20, the locking ring 22 and also the switch ring 25 is referred to as a whole as 27. The locking sleeve 20 has various guide contours 29, 30 which are provided for interaction with control cams 31 of the locking ring 22. With the help of the different guide contours 29, 30, the locking sleeve 20 and with it also the spring plate 3 can be locked in two different height settings. As soon as the spring plate 3 is locked, the chassis actuator 10 can be operated as an electromagnetic damper, in other words in shock-absorbing mode, when the coupling 21 is open.

LIST OF REFERENCE NUMBERS

1 Wheel carrier
2 Housing
3 Spring plate
4 Chassis spring
5 Bearing
6 Electric motor
7 Bearing
8 Sleeve
9 Threaded spindle
10 Chassis actuator
11 Slide bearing element
12 Centrifugal force brake
13 Spindle nut
14 Coupling
15 Spindle nut
16 Bearing element
17 Threaded spindle
18 Lower housing part
19 Linear guide
20 Locking sleeve
21 Coupling
22 Locking ring
23 Bearing
24 Bearing
25 Switch ring
26 Rotor
27 Locking unit
28 Upper housing part
29 Guide contour
30 Guide contour
31 Control cam
ΔL Displacement path

The invention claimed is:

1. An electromechanical chassis actuator having two screw drives arranged coaxially to one another which each comprise a spindle nut and a threaded spindle and having a single electric motor, the rotor of which is coupled to a first of the spindle nuts, wherein a switchable coupling interacts with the screw drives for switching between a level-adjustment mode and a damping mode of the screw drive, wherein the rotor is rigidly coupled to the first of the spindle nuts and switchably coupled to a second of the spindle nuts via the coupling.

2. The chassis actuator of claim 1, wherein the threaded spindle of the screw drive which includes the second spindle nut is configured as a hollow spindle.

3. The chassis actuator of claim 2, wherein the threaded spindle of the screw drive which includes the first spindle nut engages with the threaded spindle configured as a hollow spindle.

4. The chassis actuator of claim 1, wherein the screw drive which includes the second spindle nut is configured as a self-locking screw drive.

5. The chassis actuator of claim 1, wherein a spring plate is displaceable in an axial direction of the threaded spindle.

6. The chassis actuator of claim 5, having an indexing mechanism for the effective fixing of the spring plate in the axial direction in the damping mode.

7. The chassis actuator of claim 1, wherein the coupling is a magnetorheological fluid coupling.

8. A method of operating a chassis actuator arranged in a chassis of a motor vehicle which has two screw drives and a single electrical drive provided for actuation of the screw drives and also a coupling provided for switching between different operating modes of the chassis actuator, wherein a rotor of the electrical drive is connected to the one screw drive and is switchably coupled to the other screw drive via the coupling, the method comprising:
   in a first switching position of the coupling, undertaking a level adjustment of the chassis by means of the other screw drive,
   in a second switching position of the coupling, achieving a damping action of the chassis actuator by means of the one screw drive, wherein a damping force acts on a rotating component of the screw drive.

* * * * *